Figure 1:
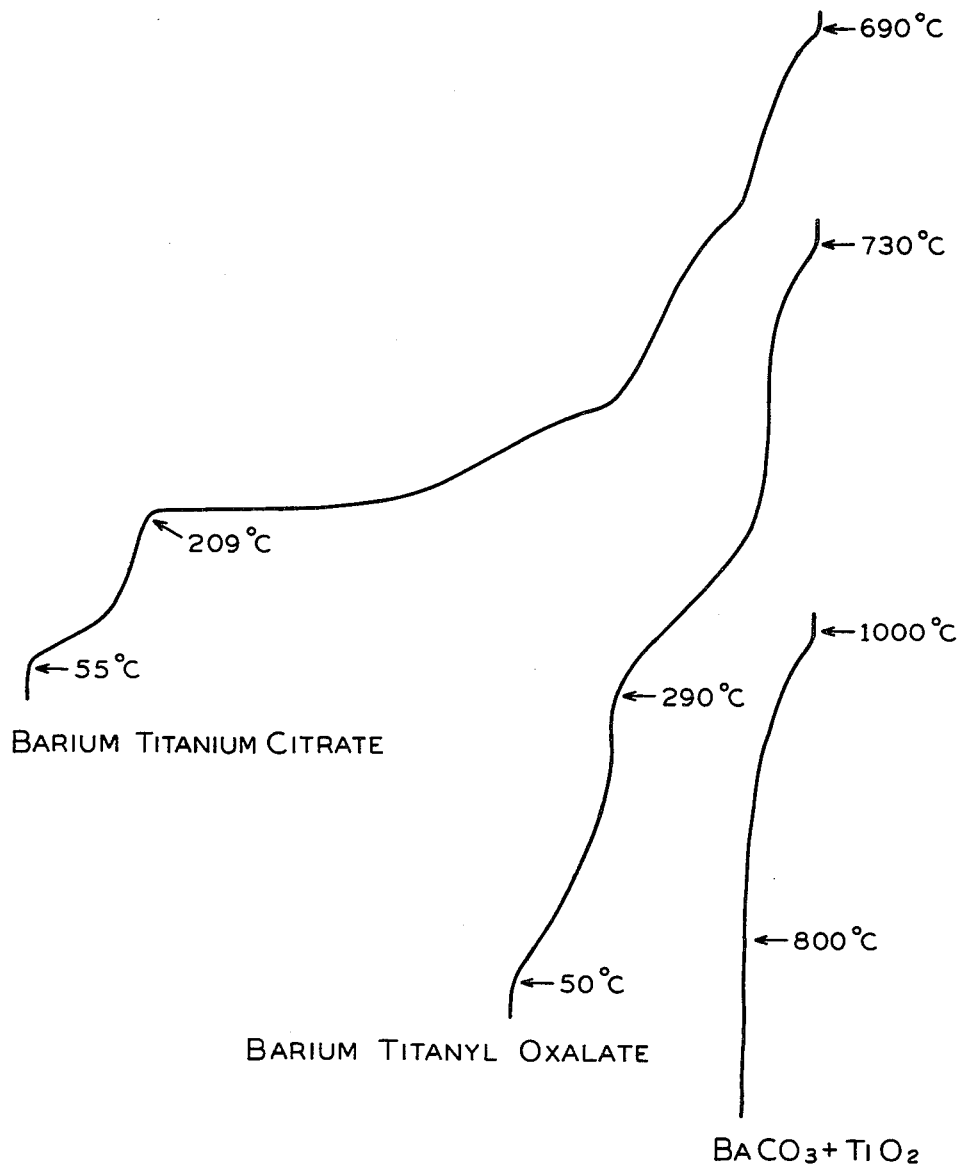

3,231,328
BARIUM TITANIUM CITRATE, BARIUM TITANATE AND PROCESSES FOR PRODUCING SAME
Maggio P. Pechini, North Adams, Mass., assignor to Sprague Electric Company, North Adams, Mass., a corporation of Massachusetts
Filed Mar. 19, 1962, Ser. No. 180,707
10 Claims. (Cl. 23—51)

The present invention relates to barium titanate. It is particularly concerned with a process for producing high purity barium titanate from low purity raw materials. The invention is also concerned with a new compound, from which high purity barium titanate can be formed.

The importance of barium titanate as ceramic piezoelectric and dielectric bodies is now well established. It is essential for these purposes that the barium titanate be of high purity inasmuch as less than 0.1 percent of certain impurities greatly alter its electrical properties. The desirability of an inexpensive method of forming high purity barium titanate is obvious.

It is known to form barium titanate by reacting titanium oxalate with barium chloride and calcining the resulting barium titanyl oxalate. It is stated that the usual method of forming $BaTiO_3$ from $TiO_2$ and $BaCO_3$ is not satisfactory because, even when C.P. grade raw materials are used, the alkali metal and alkaline earth metal oxide impurities are undesirably high and not readily removed. By reason of the oxalate process it is claimed that these impurities are reduced to less than 0.1%.

Another prior art process similar to the above oxalate process involves calcining barium oxide and titanium oxide, dissolving the reaction product in hydrochloric acid, removing insoluble impurities therefrom, adding oxalic acid to precipitate barium titanyl oxalate and calcining to form barium titanate. This process effectively reduces all impurities to an acceptable level with the exception of strontium oxide which remains in the amount of about 0.3%.

Both processes, while being an improvement over the barium oxide or carbonate and titania process, leave something to be desired. For example, any of the economical commercially available barium compounds to be used as the barium source contain appreciable amounts of calcium and strontium salts. These salts form insoluble compounds in the presence of oxalic acid and are incorporated into the barium titanyl oxalate hydrate which precipitates on instant contact with the barium source. Thus, in order to effectively control the level of calcium and strontium impurities and still use the oxalate process, these compounds must be removed from the barium source prior to its introduction into the oxalate solution. This removal adds considerable expense to the process and seems to negate any advantage gained in employing the oxalate process. Moreover, barium titanyl oxalate is only sparingly soluble in water, this rules out obtaining any greater degree of purity by means of recrystallization. It is also clear from the prior art that the purity level maximum of 0.05% for the individual oxide impurities has not been achieved.

It is an object of the present invention to overcome the foregoing and related problems.

A further object of the invention is to provide a process for producing high purity barium titanate.

Yet another object of the invention is the preparation of novel compound from which high purity barium titanate may be produced.

Still another object of the invention is to provide a method for purifying barium titanate.

It is also an object of the instant invention to form a ceramic dielectric having a high dielectric constant.

Figure 2:
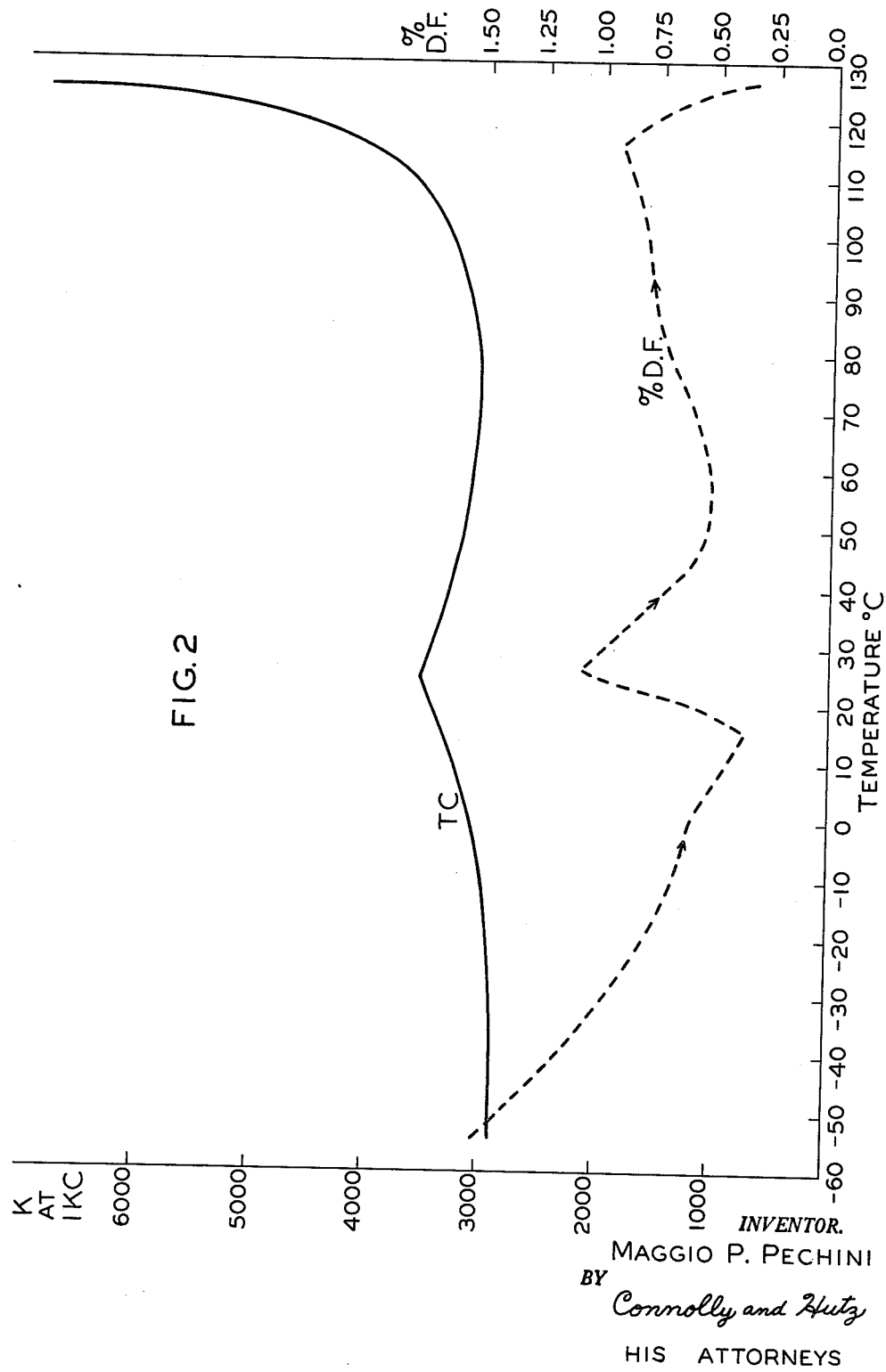

These and other objects and advantages will be apparent from the following description and accompanying drawing, in which:

FIGURE 1 shows pyrolysis curves for barium titanium citrate, barium titanyl oxalate and for barium carbonate plus titania; and FIGURE 2 shows the temperature-dielectric constant curve and percent dissipation factor for the instant barium titanate.

Broadly, the invention concerns the formation of barium titanium citrate which may be easily converted into barium titanate by calcination.

A preferred procedure for forming barium titanium citrate comprises, reacting a titanium citrate solution with a water-soluble, inorganic barium salt, filtering and after precipitation washing the reaction product. In this process the barium source is introduced directly into the titanium citrate solution, whereupon a fairly stable supersaturated solution is formed. Any insoluble residue now formed e.g. sulfates, oxalates, etc., can be removed by filtration. On standing a hydrated barium titanium citrate compound crystallizes from the solution. At the same time calcium and strontium compounds of undetermined constitution remain dissolved in the solution and are thereby effectively separated from the barium titanium citrate. The citrate is soluble in warm water and can be recrystallized to a high state of purity.

The following specific example illustrates this aspect of the present invention.

EXAMPLE I

To a solution of citric acid (50 g. in 50 ml. $H_2O$) was added 25 ml. of tetra isopropyl titanate. The solution was heated with stirring until clear. To this was added 18 g. of $BaCl_2 \cdot 2H_2O$ dissolved in 50 ml. of $H_2O$. The solution was filtered and left standing about 48 hours. Barium titanium citrate, which crystallizes from the solution, was collected in a Buchner funnel, washed free of chloride ions, and dried at room temperature.

A Duval thermobalance was used to characterize the citrate compound. This instrument records the weight loss of a sample while subjecting it to a linear temperature rise of 300° C. per hour. The pyrolysis curve (weight loss vs. temperature) for barium titanium citrate is shown in FIGURE 1 of the accompanying drawing. The horizontal distance between 55° C. and 209° C. corresponds to the loss of 6 moles of $H_2O$ and between 209° C. to 690° C. to 3 moles of citric acid. Only $BaTiO_3$ is present above 690° C. The following table shows the percent weight loss determined by the thermobalance as compared with the calculated theoretical percent weight loss.

| Percent weight loss between | Percent found | Percent calculated | Corresponds to— |
|---|---|---|---|
| 55° C.–209° C. | 12.5 | 12.5 | 6 $H_2O$. |
| 209° C.–690° C. | 69.0 | 69.1 | 3 $C_6H_8O_6$. |
| 55° C.–690° C. | 73.0 | 73.1 | Total. |

This indicates the empirical formula $$BaO \cdot TiO_2 \cdot 3C_6H_8O_6 \cdot 6H_2O$$

for this compound. A pH titration with sodium hydroxide indicates seven $H^+$ equivalents. Unlike the oxalate, which is the salt of a substituted metatitanic acid, the citrate complex (analogous to titanium lactate) very likely involves an ester linkage as the primary bond with the titanium atom while an oxygen atom from the adjacent carboxyl group act as an electron donor to form a five membered chelate. It is an acid salt and is very soluble in ammonium hydroxide.

For comparison purposes a pyrolysis curve was run (see FIGURE 1) for barium titanyl oxalate. This oxalate was prepared by a method developed by Clabough et al., J. Research Nat. Bur. of Standards, 56, 284 (1955). The distance between 50° C. and 290° C. corresponds to 4½ moles of water and that between 290° C. and 730° C. to 2 moles of oxalic acid. At 730° C. the product is $BaTiO_3$. The following table shows the percent weight loss determined by the thermobalance as compared with the calculated theoretical percent weight loss.

| Percent weight loss between | Percent found | Percent calculated | Corresponds to— |
|---|---|---|---|
| 50° C.–290° C | 17.2 | 17.7 | 4½ $H_2O$. |
| 290° C.–730° C | 38.1 | 38.4 | 2 $C_2O_3$. |
| 50° C.–730° C | 49.1 | 49.2 | Total. |

The empirical formula for the oxalate is $$BaO \cdot TiO_2 \cdot 2C_2O_3 \cdot 4\tfrac{1}{2}H_2O$$

The third pyrolysis curve (see FIGURE 1) shows a loss of one mole of $CO_2$ between 800° C. and 1000° C. resulting from the reaction of equimole portions of $BaCO_3$ and $TiO_2$.

| Percent weight loss between | Percent found | Percent calculated | Corresponds to— |
|---|---|---|---|
| 800° C.–1,000° C | 16.0 | 15.9 | $CO_2$. |

The decomposition of the oxalate and the citrate does not proceed through a $BaCO_3+TiO_2$ intermediate. In both cases decomposition is complete at a much lower temperature than would be expected for a mixture of barium and titanium oxalates or a mixture of barium and titanium citrates. Such mixtures would show the characteristic pyrolysis curve for $BaCO_3+TiO_2$ which starts at about 800° C.

The barium titanium citrate of Example I was prepared from reagent grade materials. The citrate was ignited at 900° C. to convert it to $BaTiO_3$. To show the purity level of the $BaTiO_3$ the sample was assayed volumetrically for $TiO_2$ and flame photometry was used to determine SrO, CaO, $Na_2O$ and $K_2O$.

| $TiO_2$, percent | SrO, percent | CaO, percent | $Na_2O$, percent | $K_2O$, percent |
|---|---|---|---|---|
| 34.3 | <0.01 | <0.01 | 0.05 | 0.02 |

A preferred procedure for forming barium titanium citrate from impure $BaTiO_3$ and the subsequent formation of highly purified $BaTiO_3$ is set forth in the following example.

EXAMPLE II

To 100 ml. of 4:1 hydrochloric acid was added 40 g. of an impure $BaTiO_3$ (see analysis below). This was left standing for about 2 hours, then diluted with 300 ml. of water and 150 g. of citric acid added. The solution was filtered, left standing for about 48 hours and the crystallized barium titanium citrate collected, washed and dried.

Sample A—Part of the barium titanium citrate was ignited at 900° C. for 1 hour.

Sample B—10 g. of the barium titanium citrate was recrystallized by dissolving it in 100 mls. of water at 80° C., filtering and permitting the citrate to crystallize over a 48-hour period. The citrate was collected and ignited at 900° C. for one hour.

| Percent | Impure $BaTiO_3$ | Sample A | Sample B |
|---|---|---|---|
| $TiO_2$ | 33.5 | 34.2 | 34.2 |
| SrO | 0.32 | <0.01 | <0.01 |
| CaO | 0.09 | <0.01 | <0.01 |
| $Na_2O$ | 0.32 | 0.03 | 0.01 |
| $K_2O$ | 0.05 | 0.01 | <.01 |

The above example illustrates the outstanding effectiveness of the instant process in purifying impure $BaTiO_3$. Sample B illustrates the ease of recrystallization of barium titanium citrate.

The citrate is fibrous in nature and has a much lower bulk density than barium titanyl oxalate. When calcined, say at 800° C., the barium titanate formed retains somewhat the fibrous nature of the original citrate; needle-like, pseudo-crystals can be observed under a microscope. This material can be sintered at a relatively low temperature into a dense, fine-grained ceramic having a dielectric constant about double ($K=3400$–$3900$) that of ordinary barium titanate ($K=1800$–$2200$). At this same firing temperature barium titanate via the oxalate process was fine-grained but of low density. When fired above 1340° C. the barium titanate from both the oxalate and citrate processes sintered to dense, relatively large-grained ceramics having dielectric constants falling within that of ordinary barium titanate of high purity, i.e. within 1800–2200. An additional advantage of barium titanium citrate is that it can be fabricated directly into a disc and fired to a dense, fine-grained ceramic having an extremely high dielectric constant.

To illustrate the firing characteristics of barium titanate prepared with citric acid the following examples are presented. Example III shows that barium titanium citrate can be fabricated directly into a disc and fired to a ceramic having a high dielectric constant.

EXAMPLE III

Barium titanium citrate, prepared from reagent grade material as in Example I, was fabricated into discs by pressing at about 10,000 lbs./sq. in. without the use of a binder. These were then placed in a gradient kiln, brought up to firing temperature and held for one hour. The kiln was allowed to cool to about room temperature before removal of the discs. The discs shrunk to about one-half their original diameter. They did not warp or crack, had the appearance of a dense, fine-grained ceramic, and had an unusually high dielectric constant for $BaTiO_3$. The results are tabulated below.

| ° C. | Percent Dissipation Factor | Room Temperature Dielectric Constant at 1KC | Percent decrease in diameter |
|---|---|---|---|
| 1,320 | 0.85 | 3,430 | 52.6 |
| 1,308 | 0.85 | 3,620 | 51.8 |
| 1,296 | 1.12 | 3,370 | 51.0 |
| 1,285 | 0.9 | 3,150 | 51.0 |
| 1,274 | 1.5 | 2,600 | 49.5 |

When the foregoing procedure was attempted with barium titanyl oxalate of equivalent purity of the discs cracked in all cases.

A temperature-dielectric constant curve and the percent dissipation factor was determined for the ceramic fired at 1308° C. in the preceding example. This is shown in FIGURE 2 of the accompanying drawing. FIGURE 2 shows that although the ceramics of the instant invention have a dielectric constant about twice that of ordinary barium titanate, they still exhibit the typical temperature-dielectric constant curve for barium titanate and show a percent dissipation factor no greater than ordinary barium titanate.

Example IV shows that barium titanium citrate can be pre-fired at 800° C. and then fired at 1280° C. to yield a ceramic having a high dielectric constant. Under the same conditions BaTiO₃ formed from the oxalate is underfired.

EXAMPLE IV

Barium titanium citrate was prepared from an impure BaTiO₃ as in Example II. The citrate was prefired at 800° C. for one hour. The sample was then pressed into discs at 10,000 lbs./sq. in without the use of a binder. This was repeated with barium titanyl oxalate. In this case, however, a binder was required to effect fabrication of the discs. The discs were then fired in an electric furnace with silicon carbide heaters without the use of any special atmosphere or unusual firing cycle. The BaTiO₃ discs prepared from the citrate, pre-fired at 800° C., resulted in a fine-grained ceramic of high dielectric constant. The discs from the oxalate were underfired and appeared porous. The results are shown below.

| Pre-ignited 1 hour at 800° C. | Firing time at 1280° C., hour | Percent Dissipation Factor | Dielectric Constant | Percent diameter decrease |
|---|---|---|---|---|
| BaTi Citrate | ½ | 2.8 | 3,430 | 19.5 |
| Do | 1 | 1.4 | 3,880 | 20.1 |
| BaTi Oxalate | ½ | Underfired | | 18.0 |
| Do | 1 | Underfired | | 18.0 |

In forming barium titanium citrate by the process of Example I the titanium citrate can be formed or obtained in any convenient manner. For example, instead of using tetraisopropyl titanate, titanium tetrachloride may be reacted with citric acid. In addition to barium chloride, any other water soluble, inorganic barium salt, e.g. barium nitrate, barium bromide, etc., may be reacted with the titanium citrate. The order of additions may also be reversed. While hydrochloric acid is the preferred acid for the process of Example II any other mineral acid which will dissolve barium titanate and convert it to water-soluble salts is also contemplated, e.g. nitric acid, hydrobromic acid, etc.

The foregoing examples are presented for purposes of illustration and are not intended to limit the instant invention. Various changes and modifications, obvious to those skilled in the art may be made without departing from the scope of the invention.

What is claimed is:

1. A process for preparing barium titanium citrate comprising, dissolving barium titanate in a mineral acid that forms the water-soluble salts thereof, adding citric acid to form a solution of barium titanium citrate, removing insoluble impurities therefrom, precipitating barium titanium citrate.

2. The process of claim 1 wherein the barium titanium citrate is recrystallized from water.

3. As a new and useful compound, barium titanium citrate having the empirical formula $$BaO \cdot TiO_2 \cdot 3C_6H_6O_6 \cdot 6H_2O$$

and having seven H⁺ equivalents as determined by a pH titration with sodium hydroxide, said compound being soluble in warm water and in ammonium hydroxide and said compound decomposition to barium titanate at a temperature of at least about 690° C.

4. A process for purifying barium titanate comprising, dissolving barium titanate in hydrochloric acid adding citric acid to form a solution of barium titanium citrate, removing insoluble impurities therefrom, precipitating barium titanium citrate, washing, drying and calcining said citrate at a temperature of at least about 690° C. to form purified barium titanate.

5. A process for preparing barium titanium citrate which comprises, admixing a titanium citrate solution and an inorganic barium salt solution to form a solution of barium titanium citrate, removing insoluble impurities therefrom, precipitating barium titanium citrate, washing and drying said precipitate.

6. The process of claim 5 wherein the barium titanium citrate is recrystallized from water.

7. A process for preparing barium titanate which comprises calcining barium titanium citrate at a temperature of at least about 690° C.

8. A process for preparing barium titanate comprising, reacting a titanium citrate solution and an inorganic, barium salt solution to form a solution of barium titanium citrate, removing insoluble impurities therefrom, precipitating barium titanium citrate, washing, drying and calcining said citrate at a temperature of at least about 690° C. to form barium titanate.

9. A process for preparing a barium titanate ceramic dielectric having a high dielectric constant comprising forming barium titanium citrate into a coherent body and firing said body at a temperature of between about 1270° to about 1320° C. for about one hour to form said barium titanate.

10. A process for preparing a barium titanate ceramic dielectric having a high dielectric constant comprising pre-firing barium titanium citrate at about 800° C. for about 1 hour, forming the pre-fired material into a coherent body and firing said body at a temperature of from about 1270° to about 1320° C. for from about ½ to about 1 hour to form said barium titanate.

References Cited by the Examiner

UNITED STATES PATENTS

| 2,695,240 | 11/1954 | Oshry | 23—51 X |
| 2,758,911 | 8/1956 | Lynd | 23—51 |
| 2,827,360 | 3/1958 | Blumenthal | 23—51 |
| 2,926,183 | 2/1960 | Russel | 260—429.5 |
| 2,964,413 | 12/1960 | Merker | 23—51 |
| 3,091,625 | 5/1963 | Gilsdorf | 260—429.5 |

MAURICE A. BRINDISI, *Primary Examiner.*

UNITED STATES PATENT OFFICE
CERTIFICATE OF CORRECTION

Patent No. 3,231,328                          January 25, 1966

Maggio P. Pechini

It is hereby certified that error appears in the above numbered patent requiring correction and that the said Letters Patent should read as corrected below.

Column 5, line 51, after "citrate" insert -- , washing and drying said citrate --; column 6, line 4, for "decomposition" read -- decomposing --.

Signed and sealed this 13th day of December 1966.

(SEAL)
Attest:

ERNEST W. SWIDER                         EDWARD J. BRENNER
Attesting Officer                           Commissioner of Patents